(12) United States Patent
Mitcheson et al.

(10) Patent No.: US 9,966,801 B2
(45) Date of Patent: May 8, 2018

(54) RF ENERGY HARVESTER

(71) Applicant: Drayson Technologies (Europe) Limited, London (GB)

(72) Inventors: Paul David Mitcheson, London (GB); Stepan Lucyszyn, London (GB); Manuel Pinuela Rangel, London (GB); David Christopher Yates, London (GB)

(73) Assignee: Drayson Technologies (Europe) Limited, London (GB)

( * ) Notice: Subject to any disclaimer, the term of this patent is extended or adjusted under 35 U.S.C. 154(b) by 0 days. days.

(21) Appl. No.: 15/669,023

(22) Filed: Aug. 4, 2017

(65) Prior Publication Data

US 2017/0358957 A1 Dec. 14, 2017

Related U.S. Application Data

(63) Continuation of application No. 14/909,862, filed as application No. PCT/GB2014/052431 on Aug. 8, 2014, now Pat. No. 9,837,865.

(30) Foreign Application Priority Data

Aug. 9, 2013 (GB) .................................. 1314307.8

(51) Int. Cl.
*H02J 50/20* (2016.01)
*H01Q 5/364* (2015.01)
(Continued)

(52) U.S. Cl.
CPC ............. *H02J 50/20* (2016.02); *H01Q 1/248* (2013.01); *H01Q 5/364* (2015.01);
(Continued)

(58) Field of Classification Search
CPC ..................................................... H02J 50/20
See application file for complete search history.

(56) References Cited

U.S. PATENT DOCUMENTS 4,079,268 A 3/1978 Fletcher et al.
6,486,847 B1 11/2002 Yamamoto et al.
(Continued)

FOREIGN PATENT DOCUMENTS

CN 202917639 U 5/2013
EP 0434374 A2 6/1991
(Continued)

OTHER PUBLICATIONS

Chaturvedi, et al., "Ultra-Wide Bandwidth Circular Monopole Antenna," *International Journal of Scientific Research Engineering and Technology*, vol. 1, No. 5, pp. 279-282, Aug. 2012.
(Continued)

*Primary Examiner* — Daniel Cavallari
(74) *Attorney, Agent, or Firm* — Sunstein Kann Murphy & Timbers LLP

(57) ABSTRACT

An antenna apparatus for harvesting ambient radio frequency, RF, energy, comprises one or more RF antenna components arranged to receive RF energy. The antenna components comprise a plurality of frequency filtering components, each filtering a respective frequency band of the received RF energy. A rectifying circuit is arranged to convert a variable electrical signal received at an input from an associated antenna, into a direct current electrical signal for supplying to an electrical energy storage unit. A power management module has an input arranged to receive the direct current and control supply of the direct current to the electrical energy storage unit. The rectifying circuit comprises a plurality of transmission lines, and the input of the rectifying circuit and the input of the power management module are connected via the transmission lines. The power management module is arranged at least partially within a boundary defined by the transmission lines.

13 Claims, 5 Drawing Sheets

(51) Int. Cl.
  *H01Q 9/04* (2006.01)
  *H01Q 1/24* (2006.01)
  *H02J 50/80* (2016.01)
  *H02J 7/02* (2016.01)

(52) U.S. Cl.
  CPC ........... *H01Q 9/0464* (2013.01); *H02J 50/80* (2016.02); *H02J 7/025* (2013.01)

(56) References Cited

U.S. PATENT DOCUMENTS

| | | | |
|---|---|---|---|
| 7,091,918 | B1 | 8/2006 | Bhansali et al. |
| 7,167,090 | B1 | 1/2007 | Mandal et al. |
| 7,619,570 | B1 | 11/2009 | Sarehraz et al. |
| 7,956,572 | B2 | 6/2011 | Zane et al. |
| 8,115,683 | B1 | 2/2012 | Stefanakos et al. |
| 2002/0140607 | A1* | 10/2002 | Zhou ..................... H01Q 1/243 343/700 MS |
| 2005/0104553 | A1 | 5/2005 | Mickle et al. |
| 2005/0186994 | A1 | 8/2005 | Rahmel et al. |
| 2007/0047056 | A1 | 3/2007 | Kempa et al. |
| 2007/0069965 | A1 | 3/2007 | Sarehraz et al. |
| 2007/0096990 | A1 | 5/2007 | Sarehraz et al. |
| 2007/0137697 | A1 | 6/2007 | Kempa et al. |
| 2007/0240757 | A1 | 10/2007 | Ren et al. |
| 2007/0247386 | A1 | 10/2007 | Lee et al. |
| 2009/0067208 | A1 | 3/2009 | Martin et al. |
| 2009/0284419 | A1 | 11/2009 | Kim et al. |
| 2009/0308443 | A1 | 12/2009 | Cutler |
| 2010/0090656 | A1 | 4/2010 | Shearer et al. |
| 2010/0193017 | A1 | 8/2010 | Huth |
| 2011/0175461 | A1 | 7/2011 | Tinaphong |
| 2011/0309686 | A1 | 12/2011 | Scherbenski et al. |
| 2012/0019428 | A1 | 1/2012 | Ju |
| 2012/0235508 | A1 | 9/2012 | Ichikawa |
| 2012/0256492 | A1 | 10/2012 | Song et al. |

FOREIGN PATENT DOCUMENTS

| | | | |
|---|---|---|---|
| EP | 1564842 | A1 | 8/2005 |
| GB | 2479723 | A | 10/2011 |
| GB | 2517907 | A | 3/2015 |
| JP | 2000-278887 | A2 | 10/2000 |
| JP | 2003-088005 | A2 | 3/2003 |
| JP | 2011-82985 | A | 4/2011 |
| KR | 10-2008-0079281 | A | 8/2008 |
| KR | 10-1116851 | B1 | 3/2012 |
| MX | 2011008679 | A | 11/2011 |
| TW | 200843277 | A | 11/2008 |
| WO | WO 05/104331 | A1 | 11/2005 |
| WO | WO 07/048052 | A2 | 4/2007 |
| WO | WO 08/085503 | A2 | 7/2008 |
| WO | WO 10/086587 | A1 | 8/2010 |
| WO | WO 2011/087452 | A1 | 6/2011 |
| WO | WO 12/092209 | A2 | 7/2012 |
| WO | WO 15/019106 | A2 | 2/2015 |

OTHER PUBLICATIONS

Costanzo, et al., "EM- and Piezo-Scavengers: Two Useful Solutions in Highly Humanized Scenarios Toward a Greener World," International Microwave Workshop Series on Innovative Wireless Power Transmission: Technologies, Systems and Applications, *IEEE*, pp. 15-18, May 2012.
Dehbashi, et al., "A Harmonic-Rejecting Inset-Fed U-Slot Antenna for Rectenna Application," Sarnoff Symposium, IEEE, 3 pages, Mar. 2006.
Franciscatto, et al., "A Different Approach to a Highly Efficient Wireless Energy Harvesting Device for Low-Power Application," Microwave and Optoelectronics Conference, *IEEE*, 5 pages, Aug. 2013.
Franciscatto, et al., "High-Efficiency Rectifier Circuit at 2.45 GHz for Low-Input-Power RF Energy Harvesting," European Microwave Conference, *IEEE*, 4 pages, Oct. 2013.
Lai, et al., "Broadband Aperture-Coupled Microstrip Antennas with Low Cross Polarization and Back Radiation," *Progress in Electromagnetics Research Letters*, vol. 5, pp. 187-197, 2008.
Liang, et al., "Study of a Circular Disc Monopole Antenna for Ultra Wideband Applications," *Proceedings of ISAP, Sendai*, Japan, 4 pages, 2004.
Liang, et al., "Study of a Printed Circular Disc Monopole Antenna for UWB Systems," *IEEE Transactions on Antennas and Propagation*, vol. 53, No. 11, pp. 3500-3504, Nov. 2005.
Paing, et al., "Resistor Emulation Approach to Low-Power Energy Harvesting," *IEEE Transactions on Power Electronics*, vol. 23, No. 3, pp. 1494-1501, May 2008.
Piñuela, et al., "Ambient RF Energy Harvesting in Urban and Semi-Urban Environments," *IEEE Transactions on Microwave Theory and Techniques*, vol. 61, No. 7, pp. 2715-2726, Jul. 2013.
Ray, "Design Aspects of Printed Monopole Antennas for Ultra-Wide Band Applications," *International Journal of Antennas and Propagation*, vol. 2008, Article ID 713858, 8 pages, Jan. 19, 2008.
Sima, "Design of a Large Area Rectenna for Energy Harvesting using Ambient RF Energy," Master's Thesis, Final Presentation, 6 pages.
Takhedmit, et al., "A 2.45-GHz Low Cost and Efficient Rectenna," Proceedings of the Fourth European Conference on Antennas and Propagation, *IEEE*, 5 pages, Apr. 2010.
Takhedmit, et al., "A 2.45-GHz Dual-Diode Rectenna and Rectenna Arrays for Wireless Remote Supply Applications," *International Journal of Microwave and Wireless Technologies*, vol. 3, No. 3, pp. 251-258, Jun. 9, 2011.
Zhong, et al., "Study of a Circular Disc Monopole Ultrawide-band Miniature Antenna," *Progress In Electromagnetics Research Symposium*, Hangzhou, China, pp. 1169-1173, Mar. 24-28, 2008.
European Patent Office, Extended European Search Report—Application No. 16180978.5-1811 dated Nov. 22, 2016, 6 pages.
Intellectual Property Office, Search Report for GB Application No. 1314307.8, dated Nov. 20, 2013, 2 pages.
Intellectual Property Office, Further Search Report for GB Application No. 1314307.8, dated Feb. 21, 2014, 2 pages.
International Searching Authority, International Search Report and Written Opinion for PCT/GB2014/052431, dated Apr. 2, 2015, 17 pages.
International Searching Authority, International Preliminary Report on Patentability for PCT/GB2014/052431, dated Feb. 18, 2016, 10 pages.
UK Intellectual Property Office, Examination Report Under Section 18(3)—Application No. GB1314307.8, dated Mar. 16, 2017, 8 pages.
Notice of Reasons for Rejection, Application No. 2017-112566, 4 pages, dated Jan. 23, 2018.
Notice of Reasons for Rejection, Application No. 2017-112566, 4 pages, dated Jan. 23, 2018 (English Translation).

* cited by examiner

RF ENERGY HARVESTER

RELATED APPLICATIONS

This application is a continuation of U.S. patent application Ser. No. 14/909,862, entitled "RF Energy Harvester" and filed Feb. 3, 2016. U.S. application Ser. No. 14/909,862 claims priority to PCT/GB2014/052431, entitled "RF Energy Harvester" and filed Aug. 8, 2014, which in turn claims priority to UK Patent Application No. 1314307.8, entitled "RF Energy Harvester" and filed Aug. 9, 2013. The contents of all of these applications are hereby incorporated by reference in their entireties.

FIELD OF INVENTION

This disclosure relates to an apparatus for harvesting RF energy. More specifically, but not exclusively, an antenna for receiving ambient RF energy is disclosed. In addition, a rectifier forming part of an RF energy harvesting system and the integration of the rectifier with a power management module is disclosed.

BACKGROUND TO THE INVENTION

Many electrical devices, particularly portable or remote electrical devices are powered by batteries. Batteries usually require recharging or replacing on a regular basis for continued operation of the electrical device. However, it is not always desirable or possible to connect a device to a mains power supply for recharging, or easy to gain access to the device for replacing the batteries. Moreover, it may not be possible to rely on a battery to perform with 100% reliability over extended periods and/or extreme operational/environmental conditions. As such, other means for powering/charging devices have been explored.

One proposal for obtaining electrical energy for electrical devices is by means of energy harvesting at the electrical device. Energy harvesting involves converting energy from clean, freely available sources into electrical energy and represents an environmentally friendly solution. Commonly used free energy solutions for powering electrical devices include solar, thermal and vibrational energy sources. For example, practical solar harvesters, such as solar panels and solar rectennas, utilize photovoltaic cells to convert photons into electrical energy via the photovoltaic effect. However, solutions such as solar harvesters are not appropriate for many types of remote electrical devices and are also not ideal for use in many geographical locations.

An alternative proposal is the wireless delivery of electrical power. For example, high power RF sources can be used to deliver RF power in a specific frequency band to recipient devices. The recipient devices then receive the RF energy and convert it into an electrical form, which can be used to power the device. Such systems can work efficiently in certain environments. However, such systems rely upon the presence of high energy RF transmitters, which reduces the overall attractiveness of such systems due to the need to install infrastructure, and therefore limits the number of possible applications that can use such technology.

Due to the expanse in the mobile telecommunications industry in recent decades and the corresponding increase in ambient RF energy, some research has looked at whether such ambient RF energy could be harvested. Presently, few practical energy collection solution for harvesting ambient RF energy have been reported, despite the abundance of such energy. One of the key challenges in respect of harvesting RF energy includes the collection of very low RF power, which can be as low as 10 nW. At present, RF energy harvesting does not look to be a viable option.

There is therefore still a requirement for alternative sources of power for remote devices.

SUMMARY OF INVENTION

In accordance with an aspect of the invention there is provided an antenna apparatus for use in harvesting ambient radio frequency, RF, energy. The apparatus comprises one or more RF antenna components arranged to receive RF energy for producing electricity. The one or more RF antenna components comprise a plurality of frequency filtering components, each frequency filtering component being arranged to filter a respective frequency band of the received RF energy.

The frequency filtering components may form part of the one or more RF antenna components. The frequency filtering components may be features formed in or on the one or more RF antenna components. Filtering characteristics of the features may be determined according to the dimensions of the features. The features may be formed in or on the one or more RF antenna components at positions associated with one or more resonant frequencies of the one or more RF antennas within which they are formed.

The respective frequency bands that the plurality of frequency filtering components are arranged to filter may be one or more known electromagnetic radiation frequency bands. The one or more known electromagnetic radiation frequency bands may include one or more of GSM900, GSM1800, 3G, and 4G.

One of the one or more RF antenna components may be a circular radiating patch arranged to receive a first frequency range. A first of the plurality of frequency filtering components may be a curved feature formed concentrically in or on the circular radiating patch. The first filtering component may be arranged for filtering one or more frequencies within the first frequency range.

The first frequency filtering component may be positioned at a distance from the centre of the circular radiating patch of between $\lambda_g/12$ and $\lambda_g/16$, between $\lambda_g/6$ and $\lambda_g/15$ in length, and between $\lambda_g/18.5$ to $\lambda_g/24.2$ in width, wherein $\lambda_g$ is a wavelength at a centre frequency of the respective frequency band associated with the respective frequency filtering component.

A second of the plurality of frequency filtering components may be a curved feature formed concentrically in or on the circular radiating patch arranged for filtering one or more frequencies within the first frequency range. The one or more frequencies filtered by the second frequency filtering component may differ to the one or more frequencies filtered by the first frequency filtering component.

The second frequency filtering component may be positioned at a distance from the centre of the circular radiating patch of between $\lambda_g/12$ to $\lambda_g/24$, between $\lambda_g/4.5$ to $\lambda_g/5.7$ in length, and between $\lambda_g/18.5$ to $\lambda_g/24.2$ in width.

One of the one or more RF antenna components may be a ground plane arranged to define the radiation pattern of the antenna.

One of the plurality of frequency filtering components may be a feature formed in or on the ground plane for filtering one or more frequencies within the second frequency range. The feature formed in or on the ground plane may be U-shaped.

The feature formed in or on the ground plane may be at a distance from a nearest edge of the circular radiating patch of between $\lambda_g/5.4$ to $\lambda_g/8.1$, between $\lambda_g/7.4$ to $\lambda_g/10.5$ in length, and between $\lambda_g/15.2$ to $\lambda_g/24.2$ in width.

The RF antenna arrangement may comprise a substrate on which the circular radiating patch and the ground plane are formed. The RF antenna arrangement may comprise a connection portion at one edge of the substrate for connecting the circular radiating patch and the ground plane to a harvesting circuit. The circular radiating patch may join the connection portion via an elongate feed-line. A length of the elongate feed-line may be set so that a distance between the circular radiating patch and the ground plane defines an output impedance of the antenna. The distance between the circular radiating patch and the ground plane may be $\lambda_g/4.8$. The substrate may be flexible.

The plurality of frequency filtering components may be one or more of notches, grooves, or protrusions.

In accordance with another aspect of the invention there is provided apparatus comprising a rectifying circuit arranged to convert a variable electrical signal received at an input from an associated antenna into a direct current electrical signal for supplying to an electrical energy storage unit, the antenna for use in harvesting ambient radio frequency, RF, energy. The apparatus also comprises a power management module having an input arranged to receive the direct current and control supply of the direct current to the electrical energy storage unit. The rectifying circuit comprises a plurality of transmission lines, wherein the input of the rectifying circuit and the input of the power management module are connected via the plurality of transmission lines. The power management module is arranged at least partially within a boundary defined by the plurality of transmission lines.

The plurality of transmission lines may form first and second arms. The first arm may connect the input of the rectifying circuit to the input of the power management module via a forward biased rectifying device. The second arm may connect the input of the rectifying circuit to the input of the power management module via a reverse biased rectifying device. The first arm may comprise a first transmission line that connects the input of the rectifying circuit to the forward biased rectifying device, and a second transmission line that connects the forward biased rectifying device to the input of the power management module. The first transmission line may be arranged for impedance matching the rectifier to the associated antenna, and the second transmission line may be arranged for impedance matching the rectifying circuit with the power management module. The first transmission line may have a length of between $\lambda_g/6.8$ and $\lambda_g/8.1$, wherein $\lambda_g$ is a wavelength at a centre frequency of a respective frequency band arranged to be received by the associated antenna. A filtering circuit may be connected to the second transmission line. The filtering circuit may be a quarter wavelength stub.

The second transmission line may comprise a linking transmission line and an impedance matching transmission line. The linking transmission line may be arranged between the rectifying device and the filtering circuit. The linking transmission line is arranged to absorb a capacitive reactance associated with the rectifying device. The impedance matching transmission line may be arranged between the filtering circuit and the power management module. The linking transmission line may have a length of between $\lambda_g/4.3$ and $\lambda_g/5.6$. The impedance matching transmission line may have a length of between $\lambda_g/3.8$ and $\lambda_g/4.4$.

The power management module may be arranged within the rectifying apparatus with the following characteristics. The power management module may be connected at a first end to the output of the rectifying circuit. A distance between a second end of the power management module and the input of the rectifying circuit may be set to be between $\lambda g/2.5$ and $\lambda g/5$. A distance between a first side of the power management module may be set at between $\lambda g/6.5$ and $\lambda g/12$ from an edge of the first arm. A distance between a second side of the power management module may be set at between $\lambda g/9$ and $\lambda g/16.4$ from an edge of the second arm.

In accordance with a further aspect of the invention there is provided an RF energy harvesting system, comprising an antenna as described herein and an apparatus as described herein. The RF energy harvesting system may further comprise an electrical energy storage unit arranged to receive and store electrical energy from the power management module of the apparatus.

A rectenna for harvesting ambient RF energy at power levels below 3 µW is disclosed. The rectenna may comprise an ultra-wide band planer monopole antenna operational over the GSM900, GSM1800 and 3G RF frequency bands. The rectenna may also comprise a full-wave rectifier having a differential voltage output and operational input powers below 3 µW.

An ambient RF harvester is presented where efficiencies above 45% are achievable at input RF power levels below 3 µW. To achieve this efficiency, a single multiband antenna and a full-wave detector may be provided. Such a harvester not only charges an energy storage unit faster, but is capable of operating in more locations and/or with more flexibility in spatial orientation.

A full-wave rectifier is disclosed with differential output and a modified omnidirectional disc monopole antenna with harmonic rejection filters. The new harvester design may be capable of operating with an efficiency of 45% in locations with lower available RF power.

A tri-band RF energy harvester is disclosed with an UWB antenna and integrated harmonic band rejection. A tetra or N-element harvester array may be provided.

Advantageously, a harvester is provided that is capable of providing duty cycles higher than 11% for applications requiring up to 1 mW.

A harvester that avoids harmonic re-radiation thereby improving efficiency and minimizing detection is disclosed. The harvester may achieve this by filtering the higher order harmonics such that they are not radiated by the antenna. Consequently, it is difficult for a dedicated receiver to detect the presence of the harvester when covert operation is required.

In addition, a harvester that provides DC-load isolation from higher-order harmonics is disclosed. The harvester may achieve this by use of a high frequency filtering circuit. For example, quarter wavelength stubs may form part of the rectifier for performing such filtering. Such stubs act as short circuits at the fundamental frequency, thus filtering RF signal from the output. Alternatively, resonant structures such as LC tuned circuits can be used to perform such filtering functionality.

A harvester that is capable of 3rd harmonic rejection for all received bands is disclosed. Since half-wave rectification produces odd harmonics and full wave rectification produces even harmonics in the current waveform the high order harmonics may be filtered at the output by quarter wavelength stubs and by notches formed in the antenna.

The antenna may be formed on a substrate having a bend radius 10× the thickness of the antenna substrate. The minimum bend radius may be 8.6 mm. The substrate thickness may be 790 µm. The metal antenna formed on the substrate may be 35 µm thick. The metal may be formed of any suitable conductive material. For example, the metal antenna may be formed of copper. The dielectric properties of the substrate of dielectric constant ∈r may be 2.33 and loss tangent tan δ may be 0.0012.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
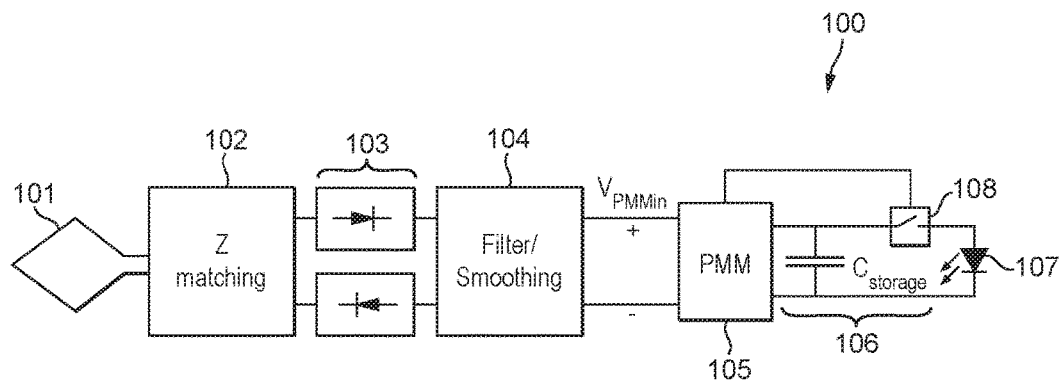
FIG. 1 illustrates an RF energy harvesting system.

A general overview of an RF energy harvesting system shall now be described with reference to FIG. 1.

A rectenna 100 is shown that includes an antenna 101 arranged to receive ambient RF energy. The antenna is designed to receive ambient RF energy across a large frequency range and therefore the electrical output of the antenna 101 has a power profile that fluctuates considerably across its reception frequency range. The output of the antenna 101, which provides a variable electrical signal, is connected to a rectifier 103 via an impedance matching network 102. The impedance matching network 102 is provided to minimize losses due to impedance mismatch between components of the rectenna. The rectifier then converts the received time varying electrical signal into a DC electrical signal. The output of the rectifier is then smoothed and filtered in a smoothing/filtering circuit 104. This smoothed DC energy is then fed into a power management module (PMM) 105 to provide useful regulated voltages and charge a storage unit 106, which in this case is a storage capacitor $C_{storage}$. The transmission of current to the storage unit 106 and corresponding electrical storage in the storage unit 106 is controlled by a power management module (PMM) 105. The PMM provides maximum power point tracking in addition to working as a boost converter. The maximum power tracking capabilities of the PMM allow the system to maximize the power transfer to the load by ensuring that the ideal load is present across a wide range of input RF power levels. Therefore, the PMM also helps to provide a good impedance match with the antenna. The PMM is also arranged to control a switch 108 that connects the electrical energy stored in the storage unit 106 to a load, which in this case is an LED for simplicity of explanation. However, in practice the PMM controls the supply of power from the storage unit 106 to the device, i.e. the load being powered.

The rectenna 100 is designed to maximize the ambient RF energy received by the antenna 101, and minimize the losses in the conversion of the received energy to energy suitable for storing in the storage unit 106. The various components of the rectenna 100 shall therefore now be described in detail.

Figure 2:
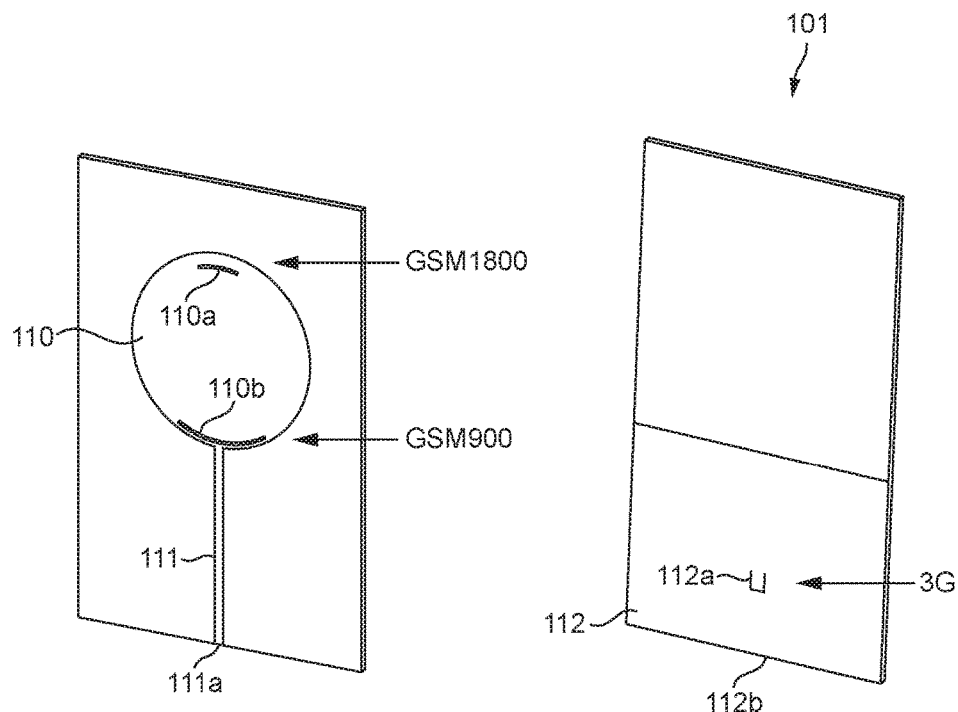
FIG. 2 illustrates a single multi-band antenna used in the system of FIG. 1.

In order to maximize the power harvested by the rectenna and reduce the size of the harvester, the antenna 101 is a single multi-band antenna, as can be seen in FIG. 2.

The antenna 101 is a planar antenna structure comprising a substrate upon which the receiving components of the antenna are formed. The antenna 101 is a modified microstrip disc monopole antenna comprising receiving components including a circular-shaped radiating patch 110, a feed line 111 and a rectangular shaped ground plane 112. The circular-shaped radiating patch 110 and feed line 111 are arranged on one side of the substrate, and the ground plane 112 is arranged on the opposing side of the substrate. While the antenna is shown as having a microstrip-based feedline it will be appreciated that a coplanar waveguide feed is provided in alternative arrangements, or a combination of both a microstrip-based feedline and a coplanar waveguide feed. The substrate may be made of any low loss material, for example, glass, ceramic, FR4. The planar characteristics of the antenna allow it to be formed on the same substrate as the rest of the harvester system.

The antenna 101 is arranged to be substantially omnidirectional in order to maximize the received RF radiation. Furthermore, the structural components of the antenna are arranged to maximize the receipt of RF energy from different possible sources. Since most ambient RF energy comes from mobile telecommunications, the antenna 101 is arranged to operate across an ultra-wide band covering a plurality of the following bands: GSM900, GSM1800, 3G, WiFi and 4G. It will be appreciated that an alternative antenna arrangement could be arranged to receive other frequency bands, higher and lower than those mentioned above to cover radio, TV and other ISM bands, if desired. The circular-shaped radiating patch 110 is primarily arranged for receiving all bands, while the ground plane 112 is modified to enhance the $3^{rd}$ harmonic rejection of specific bands 3G and 4G, which is generated by the rectification process. The arrangement of the radiating patch 110 and ground plane 112 for receiving these different frequency bands shall now be discussed in detail.

The radiating patch 110 is circular in shape and positioned on an upper portion of the substrate. An elongated electrical feed line 111 in the form of a microstrip transmission line provides a connection from the circular-shaped radiating patch 110 to an end surface of the substrate at point 111*a*. It is at this point that the antenna 100 is connectable to the next stage of the energy harvesting system. The elongate track 111 not only acts to enable the remainder of the rectenna to be connected to the radiating patch 110, but also provides impedance matching, as will be discussed. The radius of the disc is a quarter wavelength of the lowest frequency that the antenna is arranged to receive, e.g. 945 MHz for GSM900.

The ground plane 112 is rectangular in shape and extends from a bottom of the antenna substrate to a point just under half way along the length of the antenna substrate. In alternative arrangements the ground plane may take a different form. The shape of the ground plane defines the impedance and the radiation pattern. An electrical connection on an end surface of the substrate allows for the elongated track to be electrically connected to the rest of the energy harvesting system. The circular-shaped radiating patch, feedline and ground plane are formed of a conductive material such as copper.

The antenna's impedance can be modified to conjugately match that of the rectifier by varying the width of the antenna feed and the distance between the circular-shaped radiating patch and the ground plane. In particular, the distance between the bottom of the circular-shaped radiating patch 110 and the top of the ground plane 112 can be used to tune the impedance to 50Ω (or any chosen reference impedance) and optimize the desired omnidirectional pattern. The shape and overlap of the ground plane with the disc defines the radiation pattern by reflecting the field lines coming from the disc. In consequence, this also defines the gain of the antenna which can be between 2.3 and 4.8 dBi. This distance is also dependent upon the wavelengths that the antenna is arranged to receive. In practice the distance between the bottom of the circular-shaped radiating patch and the top of the ground plane is set between: $-\lambda g/20$ and $\lambda g/12.5$, where $\lambda g$ is the guided wavelength of the signal at the centre frequency of the selected frequency band. A distinction of $\lambda g$ and $\lambda o$ is used to highlight that this is the wavelength of the guided-wave structure, which is different than that in free space.

The antenna 101 has a number of frequency filtering features that are formed on the antenna and change the frequency response characteristics of the antenna. In particular, these filters are arranged to filter out the third harmonic generated by the full-wave rectifier at each one of the selected bands that the antenna is arranged to receive, e.g. GSM900, GSM1800, and 3G. When the antenna is used with a half-wave rectifier, a second harmonic filter is required, rather than a third harmonic filter.

First and second filtering notches 110a and 110b are provided on the circular-shaped radiating patch, while a further notch 112a is provided on the ground plane 112. The first and second notches 110a, 110b are curved and concentrically arranged on the circular-shaped radiating patch. The first filtering notch 110a has a length of $\lambda g/6$ to $\lambda g/7.5$. The first filtering notch is radially positioned at between $\lambda g/12$ and $\lambda g/16$ from the centre of the circular-shaped radiating patch. The width of the first filtering notch is between $\lambda g/18.5$ and $\lambda g/24.2$, which optimizes the return loss and the bandwidth of the notches. The second filtering notch 110b has a length of between $\lambda g/4.5$ and $\lambda g/5.7$, a width of between $\lambda g/18.5$ and $\lambda g/24.2$, and the notch is radially positioned $\lambda g/12$ to $\lambda g/24$ from the centre of the circular-shaped radiating patch. By modifying the position and the width of the notches, the return loss can be increased and the bandwidth optimized to cover all of the targeted frequencies. It is the resonances generated by the position and geometry of the notches that defines the associated return loss and bandwidth of the filtering provided by the notches.

The notch 112a formed in the ground plane 112 is U-shaped with the base of the U facing downwards. The centre of the notch in the ground plane 112 is between $\lambda g/5.4$ to $\lambda g/8.1$ from the lower edge of the circular radiating patch, and the notch 112a has a length of between $\lambda g/7.4$ and $\lambda g/10.5$ and a width of between $\lambda g/15.2$ and $\lambda g/24.2$.

In summary, the length of the first and second notches is approximately a third of the wavelength of the third harmonic and the width is proportional to the bandwidth characteristics of the filter. The U-shaped 112a notch is included to filter the harmonics created by the 3G rectifier Since there is a different rectifying circuit for each band, and each rectifier generates third order harmonics corresponding to their frequency of operation, different filters or notches are required for each respective component of the antenna.

In alternative arrangements additional notches can be added to the structure, especially in the circular-shaped radiating patch. Additional notches may be used if harvesting is also desired at other bandwidths, such as 4G or WiFi. However, harmonic rejection will be lower than $-2$ dB. In other words, the additional filters will not be able to achieve the desired filtering properties and it is possible than around 50% of the power in the harmonics will not be filtered.

Figure 3:
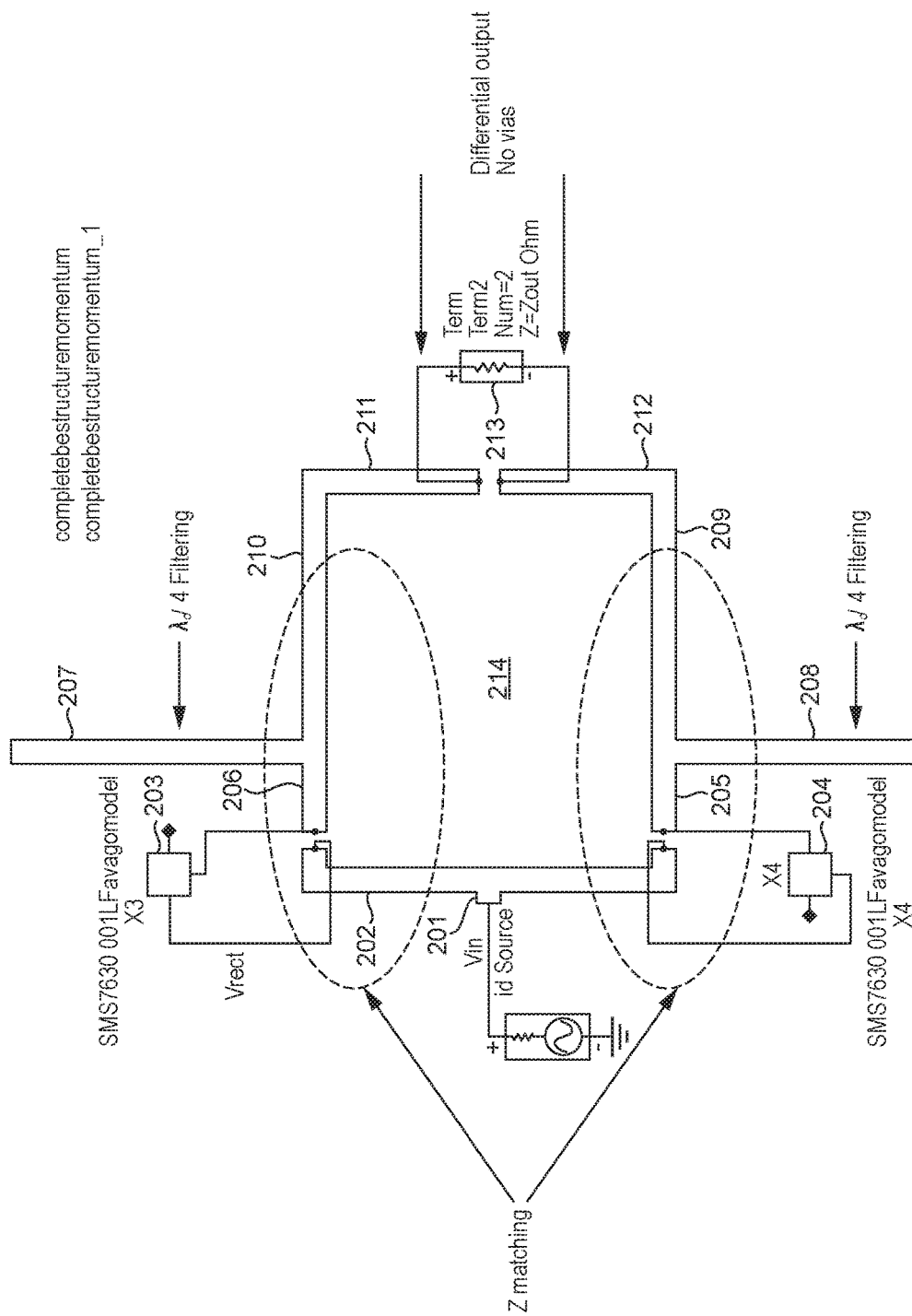
FIG. 3 illustrates a microstrip full-wave rectifier with a differential output as used in the system of FIG. 1.

FIG. 3 illustrates the rectifying circuit 103 of FIG. 1. The rectifying circuit 103 is a microstrip full-wave rectifier with a differential output. The rectifying circuit shown in FIG. 3 includes the impedance matching 202, rectifier 203, and filtering 104 components shown in the schematic diagram of FIG. 1. The rectifying circuit is designed to be as lossless as possible to thereby reduce diode voltage drops resulting of a conventional full-wave (four diode) rectifier. This is primarily achieved by ensuring that accurate impedance matching is provided throughout the circuit. The rectifier 203 is tuned to the frequency of the frequency range that it is receiving form the antenna 101. In the case of the antenna 101, which is arranged to receive multiple bands, multiple rectifiers 203 are provided for each respective band. However, in the Figures only a single rectifier is shown and explained for ease of explanation.

The output from the antenna 101 is received at the feed 201 of a microstrip transmission line. At this point the microstrip transmission line splits into two arms, one connecting the input of the rectifier to the output via a forward biased rectifying element 203, and a second arm connecting the input of the rectifier to the output via a second reverse biased rectifying element 204.

The arms of the microstrip transmission line 202 therefore extend perpendicularly left and right from the input 201. The track width of the microstrip transmission line is set according to the desired characteristic impedance of the circuit. The track width can also be set in order to simplify the impedance matching of the rectifying circuit with the antenna. At each end of the impedance matching microstrip transmission line 202 further parallel tracks run for a short distance perpendicular to the impedance matching microstrip transmission line 202 and then each join a first terminal of a respective rectifying element 203, 204. The length of impedance matching microstrip transmission line 202 is set so as to match the impedance of the antenna 101, which in this case is 50Ω. This length is preferably between $\lambda g/6.8$ and $\lambda g/8.1$. Hence, the impedance matching microstrip transmission line is performing the functionality of the impedance transformer 102 of FIG. 1. The width and length of the microstrip transmission lines between the input and the rectifying elements are used to tune the input impedance of the rectifier.

The rectifying elements are Schottky diodes 203, 204, with the first diode 203 being forward biased and the second diode 204 being reverse biased. It will be appreciated that in alternative arrangement a transistor based rectifying arrangement may be provided, for example FETs may be modified to perform the rectification functionality.

The further microstrip transmission line then extends for another short portion 205, 206 from a second terminal of the respective diode 203, 204. The length and width of this part of microstrip line is arranged to absorb the capacitive reactance of the diode because they define an inductive reactance. In addition, the length and width of this part of the microstrip line can be used in tuning the input impedance of the rectifying circuit. The length of the further microstrip transmission line 205, 206 is preferably between $\lambda g/4.3$ and $\lambda g/5.6$. At this point, $\lambda/4$ stubs 207, 208 extend perpendicularly from the ends of the microstrip transmission lines 205, 206. The $\lambda/4$ stubs 207, 208 perform the filtering functionality 104 of FIG. 1. The stubs are used to filter the fundamental harmonic from the output, providing DC at the output. The $\lambda g/4$ stub ensures that the fundamental and the higher order harmonics are below $-45$ dBm.

The microstrip transmission line then continues past the stubs for a longer distance 209, 210, until the two arms of the microstrip transmission line extend perpendicularly such that they are again aligned and join at the two output terminals. This section is preferably between λg/3.8 and λg/4.4 in length. This section works as an impedance transformer so that the load and the rest of the rectifier have the conjugate match of the antennas' input impedance throughout a range of frequencies and input power levels.

In use, diode 203 rectifies the positive part of the received signal and diode 204 rectifies the negative part of the received signal. The quarter wavelength stubs filter the fundamental harmonic from the output ensuring that DC is available. Since the output connections are not grounded, the negative voltage coming from the diode 204 is the reference to the rest of the system blocks, providing a higher voltage to reach the cold-start voltage (330 mV) of the PMM.

The output is a differential output, which allows the system to provide a higher output voltage VPMM and reach the minimum voltage required by the Power Management Module (PMM), 330 mV, with input power levels below 3 μW (−25 dBm). Furthermore, by using a differential output ground vias are avoided, reducing losses, helping to achieve a better match between simulations and measurements, as well as simplifying fabrication.

A single full-wave rectifier can achieve 12% efficiency at −26 dBm of input power and up to 46% at −10 dBm. The return loss is below the −10 dB limit ensuring an almost complete cover of the selected operating band. The fractional bandwidth varies between 2 to 6.2% depending on the operating frequency. The output of the harvester for the input power range mentioned previously is between, 75 to 550 mV.

Figure 4:
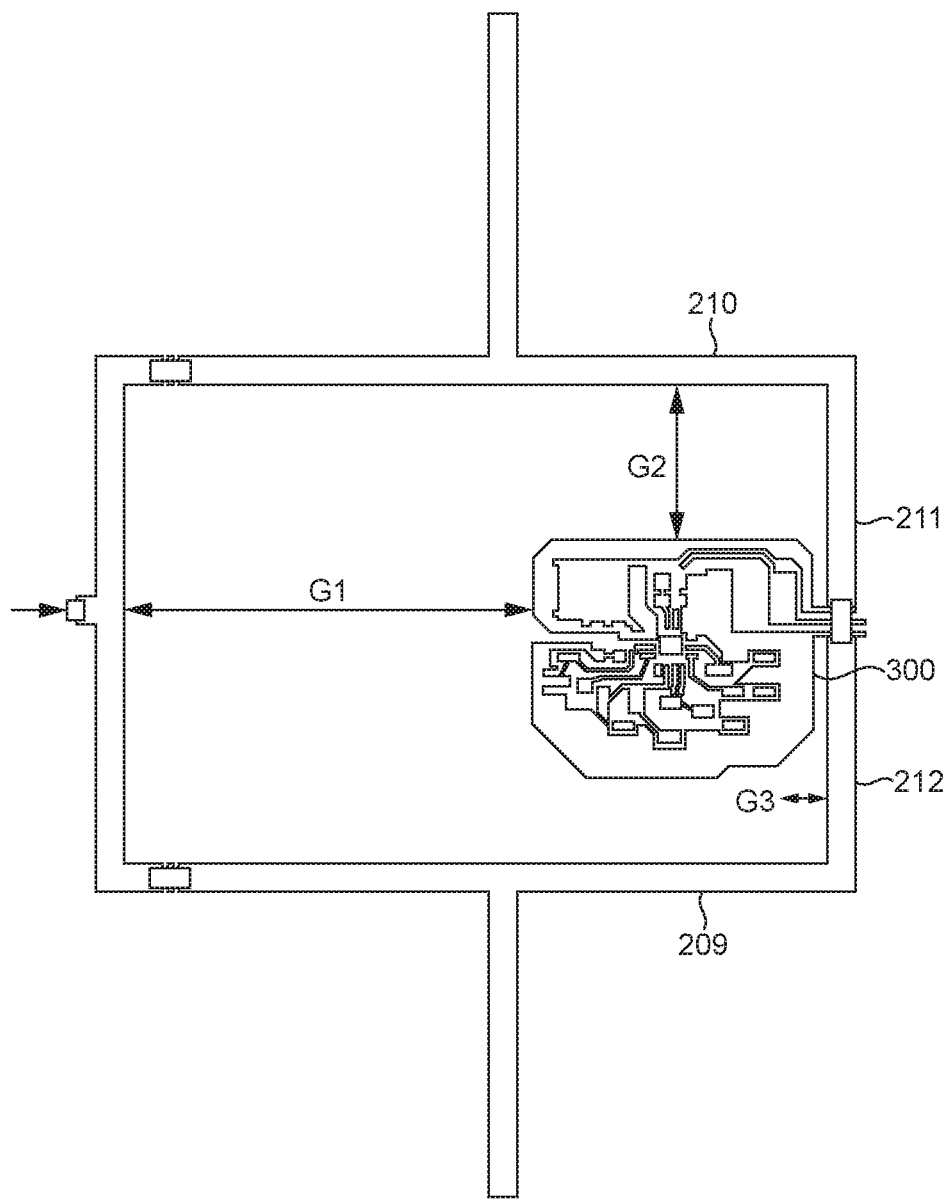
FIG. 4 illustrates the rectifier of FIG. 4 with the PMM circuit placed inside the rectifier.

In order to minimize the footprint of the complete RF energy harvester, the PMM circuit 300 is placed inside a boundary defined by the transmission lines of the full-wave rectifier as shown in FIG. 4. This is in contrast to known systems which place the PMM 300 in series with the rectifier outside the perimeter of the rectifier. However, careful considerations are required to avoid coupling between the rectifying structure and the miniaturized PMM circuit 300. To minimize the electromagnetic interaction between the PMM circuit 300 and the full-wave rectifier the distance between the edge of the PMM circuit 300 and the microstrip transmission line of the rectifier are set as follows. The PMM circuit 300 joins the differential output directly. Hence, the distance between the PMM circuit 300 and the microstrip transmission line 211, 212 joining the differential output is negligible. Then, the distance between the opposite end of the PMM circuit 300 to the one joining the differential output and the input to the rectifying circuit is set to be between λg/2.5 and λg/5. A first side of the PMM circuit 300 is set at between λg/6.5 and λg/12 from a first upper edge 210, as well as from the second lower edge of the microstrip transmission line and the distance between the PMM 300 and the differential output is set at between λg/9 and λg/16.4.

In the arrangement shown in FIG. 4 the PMM 300 is provided substantially within the boundary defined by the transmission lines. It will be appreciated that in alternative arrangements the PMM may only be provided within some of the boundary of the transmission line, which would still provide some of the space savings the energy harvester system as a whole.

In addition to the location of the PMM circuit, the layout shown in FIG. 4 avoids the use of vias, while providing connections for the rectifier's differential output and the "grounded" PMM output.

Figure 5:
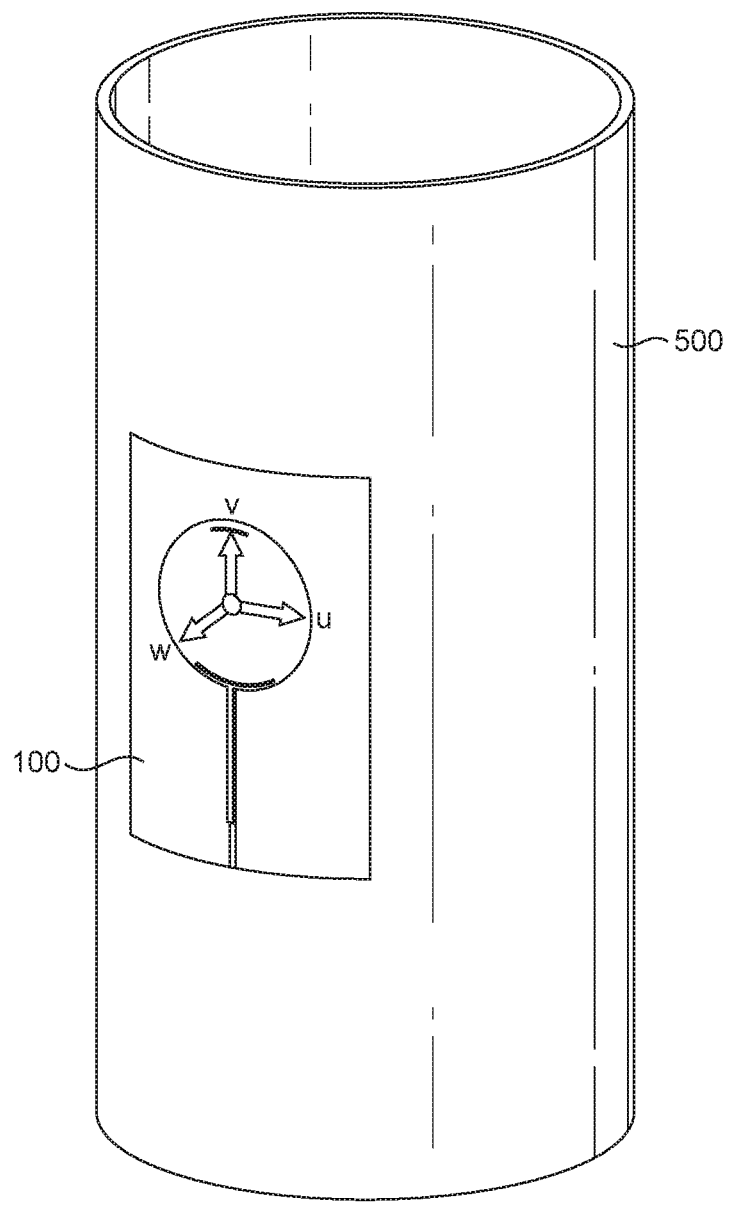
FIG. 5 illustrates an antenna conformed to the surface of a pipe.

FIG. 5 shows how the antenna, and in consequence the rectenna, can conform to surfaces. In this case, the substrate on which the antenna 100 is formed is made from a flexible material. Consequently, the antenna 100 is bent around a pipe 500. In this conformal antenna design the pipe 500 is a PVC water pipe with the following characteristics: radius=5-10 cm, ϵr=2.88, and tan δ=0.089. There is no return loss degradation from bending the antenna around the pipe.

Figure 6:
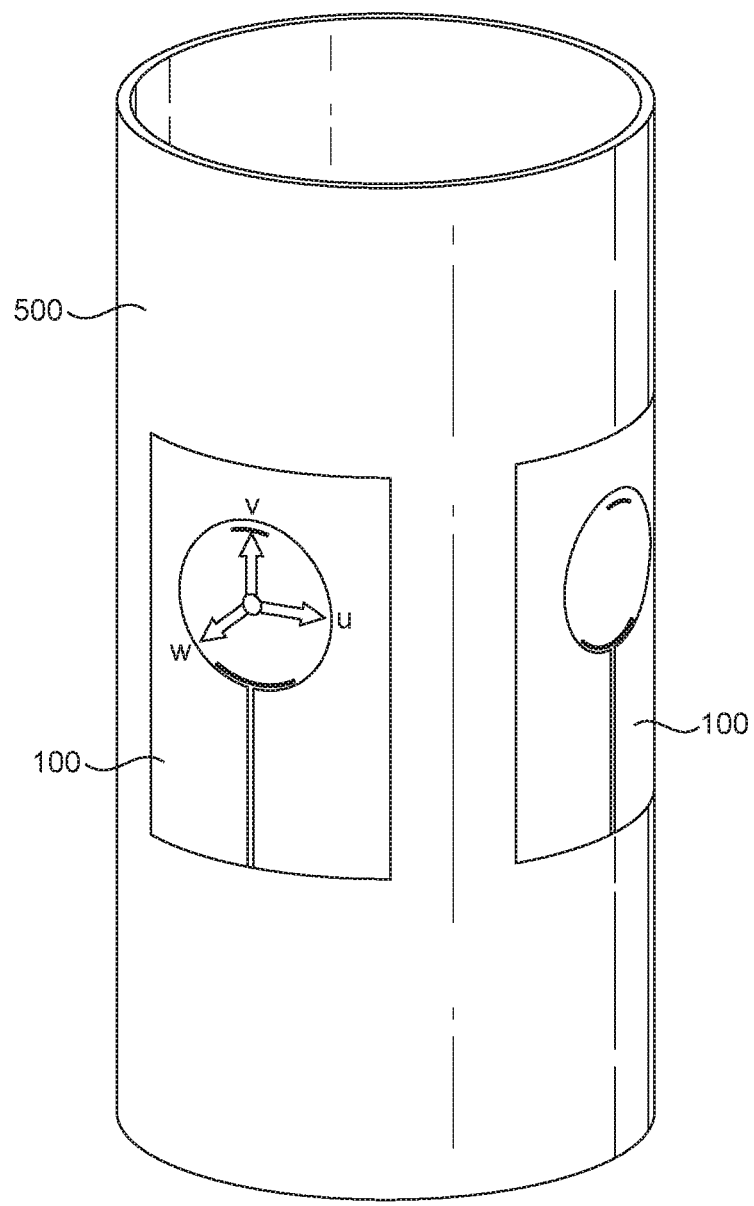
FIG. 6 shows an array of antennas conformed to the surface of a pipe.

It will also be appreciated that in an alternative arrangement multiple antennas may be provided in an array. For example, FIG. 6 shows an array of antennas 100 conformed to a pipe 500. Use of several rectennas increases the total harvested power. The distance between each harvester can be as close as λo/4.8, where λo is the wave-length of the antenna's first resonance.

It will be appreciated that these examples of conforming the antenna to a pipe are applicable to any cylindrical object.

It will be appreciated that alternative arrangements could be provided wherein similar notches are placed in other types of monopoles and planar antennas such as a bow-tie and a square patch. The ground plane could be extended to modify the radiation pattern of the antenna. This would also modify the gain of the antenna.

In alternative arrangements multiple filtering components are formed together as a filtering arrangement. In other words, as single filtering arrangement is provided having multiple filtering components, each filtering component arranged to perform a specific filtering functionality such as performing filtering for a specific frequency band.

It will be appreciated that the harvester described herein may be used in various applications such as for electronic paper displays, low power displays, industrial sensors (e.g. strain-gauge, temperature, pressure, inclination, flow, proximity, smoke, gases, COx, NOx), powering LEDs, and charging storage units.

Furthermore, it will be appreciated that the impedance matching network can be omitted if the port impedance of the antenna is designed to directly match that of the rectifier.

It will be appreciated that the rectifying circuit need not be a microstrip-based circuit. For example, in alternative arrangements stripline, coplanar strip or CPW guided-wave structures are used. In yet further arrangements lumped-element or lumped-distributed components are used.

In alternative arrangements the full-wave rectifier can be scaled up or down in frequency to any desired frequency band.

In alternative arrangements the antenna is at least one of a bow-tie antenna, a modified square patch antenna, dual-monopole antenna, a log-periodic antenna, a 3D antenna, or a non-planar antenna such as a helical or double-helix antenna.

It will be appreciated that other filtering features such as protrusions could achieve the same band filtering response as the notch filter described herein. Furthermore, while the notches formed in the circular radiating patch are shown as being concentric, it will be appreciated that the notches need not be concentric. However, improved performance can be achieved by use of concentric notches.

It will be appreciated that the filtering features for different bands may be provided on either side of the antenna structure. However, use of a U-notch in the ground plane achieves an improved performance for higher frequencies than for lower frequencies.

The rectenna described above is primarily described for use in harvesting ambient RF energy. However, it will be appreciated that the rectenna can also be used for receiving RF energy from a dedicated source, or for receiving some RF energy from a dedicated source as well as harvesting ambient RF energy.

The rectifier described herein is arranged for use with a single frequency band. When an antenna is arranged to receive multiple frequency bands a respective rectifier is utilized for each band.

Where components of the system are shown or described in a way that defines a particular orientation such as upper or lower, it will be appreciated that the orientation is not important but only the relative position(s) of system components.

What is claimed is:

1. An antenna apparatus (101) for use in harvesting ambient radio frequency, RF, energy and connectable to a rectifier (103), the antenna apparatus (101) comprising:
    a substrate comprising a first side and a second side opposing the first side;
    a radiating patch (110) formed on the first side of the substrate; and
    a ground plane (112) formed on the second side of the substrate,
    wherein the radiating patch (110) is arranged to receive RF energy for producing electricity,
    wherein the radiating patch (110) comprises first and second filtering notches (110a, 110b) each being arranged to modify a return loss and bandwidth of the antenna apparatus (101) with respect to a targeted frequency of the received RF energy,
    wherein the ground plane (112) comprises a ground plane notch (112a), and
    wherein the ground plane notch (112a) is arranged to filter harmonics created by the rectifier (103).

2. The antenna apparatus according to claim 1, wherein the return loss and bandwidth of the antenna apparatus (101) modified by the first and second filtering notches (110a, 110b) are determined according to the dimensions of the first and second filtering notches (110a, 110b), and wherein the first and second filtering notches (110a, 110b) are formed in or on the one or more RF antenna components at positions associated with one or more resonant frequencies of the radiating patch (110) within which they are formed.

3. The antenna apparatus according to claim 1, wherein the targeted frequency of the received RF energy lies in one or more known electromagnetic radiation frequency bands, and wherein the one or more known electromagnetic radiation frequency bands include one or more of GSM900, GSM1800, 3G, and 4G.

4. The antenna apparatus according to claim 1, wherein the radiating patch (110) is arranged to receive a first frequency range and the radiating patch (110) is circular-shaped.

5. The antenna apparatus according to claim 4, wherein the first filtering notch (110a) is a curved feature formed concentrically in or on the circular-shaped radiating patch (110), the first filtering notch (110a) being arranged for filtering one or more frequencies within the first frequency range.

6. The antenna apparatus according to claim 5, wherein the first filtering notch (110a) is:
    positioned at a distance from the centre of the circular-shaped radiating patch of between $\lambda g/12$ and $\lambda g/16$;
    between $\lambda g/6$ and $\lambda g/15$ in length; and
    between $\lambda g/18.5$ to $\lambda g/24.2$ in width, wherein
    $\lambda g$ is a wavelength at a centre frequency of the respective frequency band associated with the respective filtering notch (110a).

7. The antenna apparatus according to claim 5, wherein the second filtering notch (110b) is a curved feature formed concentrically in or on the circular-shaped radiating patch (110) arranged for filtering one or more frequencies within the first frequency range, wherein the one or more frequencies filtered by the second filtering notch (110b) differ to the one or more frequencies filtered by the first filtering notch (110a).

8. The antenna apparatus according to claim 6, wherein the second filtering notch (110b) is:
    positioned at a distance from the centre of the circular-shaped radiating patch (110a) of between $\lambda g/12$ to $\lambda g/24$;
    between $\lambda g/4.5$ to $\lambda g/5.7$ in length; and
    between $\lambda g/18.5$ to $\lambda g/24.2$ in width, wherein
    $\lambda g$ is a wavelength at a centre frequency of the respective frequency band associated with the respective filtering notch (110b).

9. The antenna apparatus according to claim 4, wherein the ground plane is arranged to define the radiation pattern of the antenna apparatus (101).

10. The antenna apparatus according to claim 9, wherein the ground plane notch (112a) is for filtering one or more frequencies within a second frequency range.

11. The antenna apparatus according to claim 10, wherein the ground plane notch (112a) is U-shaped.

12. The antenna apparatus according to claim 10, wherein the ground plane notch (112a) is formed in or on the ground plane:
    at a distance from a nearest edge of the circular-shaped radiating patch of between $\lambda g/5.4$ to $\lambda g/8.1$;
    between $\lambda g/7.4$ to $\lambda g/10.5$ in length; and
    between $\lambda g/15.2$ to $\lambda g/24.2$ in width, wherein $\lambda g$ is a wavelength at a centre frequency of the respective frequency band associated with the respective frequency filtering component.

13. The antenna apparatus according to any of claim 9, wherein the substrate is flexible.

* * * * *